United States Patent [19]
Fischer et al.

[11] Patent Number: 5,496,915
[45] Date of Patent: Mar. 5, 1996

[54] POLYIMIDES BASED ON DIAMINES CONTAINING CYCLOALIPHATIC UNITS

[75] Inventors: Christian Fischer, Ludwigshafen; Karin Elbl-Weiser, Schriesheim; Jürgen Koch, Neuhofen, all of Germany

[73] Assignee: BASF Aktiengesellschaft, Ludwigshafen, Germany

[21] Appl. No.: 387,568

[22] Filed: Feb. 13, 1995

[30] Foreign Application Priority Data

Feb. 16, 1994 [DE] Germany .................. 44 04 891.2

[51] Int. Cl.$^6$ .................. C08G 73/10; C08G 69/26
[52] U.S. Cl. .................. 528/353; 528/26; 528/38; 528/125; 528/128; 528/172; 528/173; 528/174; 528/176; 528/184; 528/185; 528/220; 528/229; 528/345; 528/350; 428/396; 428/411.1; 428/473.5
[58] Field of Search .................. 528/353, 350, 528/125, 128, 345, 172, 173, 174, 26, 38, 176, 184, 185, 220, 229; 428/396, 473.5, 411.1

[56] References Cited

U.S. PATENT DOCUMENTS

| | | | |
|---|---|---|---|
| 4,994,579 | 2/1991 | Reuter et al. | 548/461 |
| 5,105,004 | 4/1992 | Reuter et al. | |
| 5,149,761 | 9/1992 | Reuter et al. | 528/353 |

FOREIGN PATENT DOCUMENTS

| | | |
|---|---|---|
| 368604 | 5/1990 | European Pat. Off. |
| 379006 | 7/1990 | European Pat. Off. |
| 389092 | 9/1990 | European Pat. Off. |
| 439362 | 7/1991 | European Pat. Off. |

*Primary Examiner*—P. Hampton-Hightower
*Attorney, Agent, or Firm*—Keil & Weinkauf

[57] ABSTRACT

Polyimides are obtainable by reacting a dianhydride component with a diamine component, at least one diamine containing cycloaliphatic units, with the proviso that the dianhydride component is a mixture of different dianhydrides if the diamine component consists only of one diamine containing cycloaliphatic units and the diamine component is a mixture of different diamines if the dianhydride component consists of only one dianhydride.

7 Claims, No Drawings

POLYIMIDES BASED ON DIAMINES CONTAINING CYCLOALIPHATIC UNITS

BACKGROUND OF THE INVENTION

1. Field of the Invention

The present invention relates to polyimides which are obtainable by reacting

A) a dianhydride component consisting of $a_1$) from 50 to 100 mol % of at least one dianhydride of the formula I

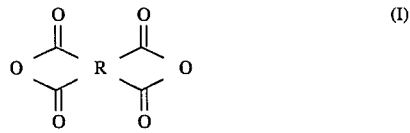

where R is a tetravalent aromatic or heteroaromatic radical, with the exception of

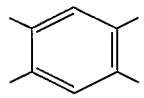

and $a_2$) from 0 to 50 mol % of a pyromellitic dianhydride with

B) a diamine component consisting of $b_1$) from 50 to 100 mol % of at least one diamine of the formula II

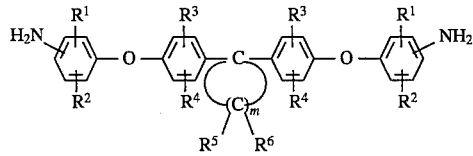

where $R^1$ to $R^4$, independently of one another, are identical or different and are hydrogen, halogen, $C_1$–$C_{12}$-alkyl, $C_1$–$C_{12}$-alkoxy, $C_5$–$C_7$-cycloalkyl, $C_6$–$C_{18}$-aryl, $C_4$- or $C_5$-hetaryl or $C_1$–$C_{12}$-alkyl-$C_6$–$C_{18}$-aryl, $R^5$ and $R^6$, independently of one another, are identical or different and can be individually selected for each C atom in the alicyclic ring and are hydrogen, $C_1$–$C_{12}$-alkyl, $C_1$–$C_{12}$-alkoxy, $C_5$–$C_7$-cycloalkyl, $C_6$–$C_{18}$-aryl, $C_4$- or $C_5$-hetaryl or $C_1$–$C_{12}$-alkyl-$C_6$–$C_{18}$-aryl, and m is an integer from 4 to 7, and $b_2$) from 0 to 50 mol % of at least one diamine of the formula III

where X, Y and Z, independently of one another, are identical or different and are a chemical bond or are selected from the group consisting of —O—, —CO—, —S—, —$SO_2$—, —$C(CH_3)_2$—, —$C(CF_3)_2$— and —$Si(CH_3)_2$— and r and s, independently of one another, are identical or different and are 0 or 1, with the proviso that the component A is a mixture of $a_1$ and $a_2$ if the component B consists only of $b_1$ and component B is a mixture of $b_1$ and b2 if the component A consists only of $a_1$. The present invention furthermore relates to the use of these polyimides. 2. Description of the Art Polyimides based on dianhydrides $a_1$ and $a_2$ and diamines $b_1$ were disclosed in EP-A1-398 092. Such polyimides are used for the preparation of liquid crystal displays since they promote the orientation of the liquid crystals. Specific diamines having cycloaliphatic rings for the preparation of polyimides for the same intended use are described in EP-A 368 604 and 439 362. Further diamines of the general formula II for the preparation of plastics or plastics blends are described in EP-A2-379 006.

It is an object of the present invention to provide novel polyimides which are based on the diamines of the general formula II and can be processed by a thermoplastic method but have a higher melt stability and exhibit better heat distortion resistance than the known polyimides.

We have found that this object is achieved by the polyimides defined at the outset. The novel polyimides are obtainable by reacting a dianhydride component A with a diamine component B.

According to the invention, the dianhydride component A is composed of from 50 to 100 mol % of at least one dianhydride al and from 0 to 50 mol % of pyromellitic dianhydride ($a_2$). The preferably used dianhydride component A consists of from 50 to 99 mol % of $a_1$ and from 1 to 50 mol % of $a_2$. A particularly preferably used dianhydride component A consists of from 65 to 99, in particular from 65 to 97, mol % of $a_1$ and accordingly from 1 to 35, in particular from 3 to 35, mol % of pyromellitic dianhydride. Mixtures of from 70 to 95 mol % of al and from 5 to 30 mol % of $a_2$ are very particularly preferably used as dianhydride component A.

DESCRIPTION OF THE PREFERRED EMBODIMENTS

According to the invention, the dianhydrides $a_1$ are of the formula I

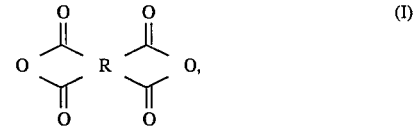

where $a_1$ does not include pyromellitic dianhydride. The preferred radicals R include the radicals having the structures

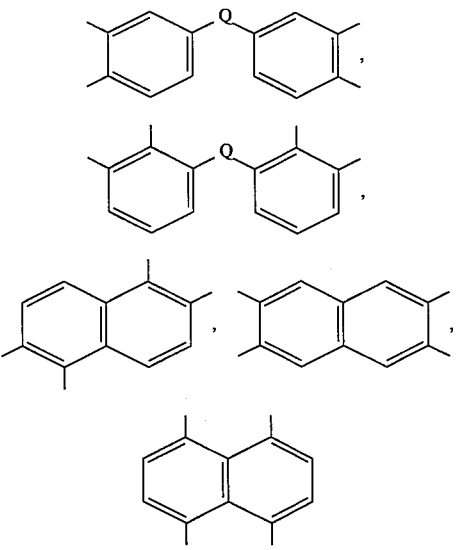

-continued and

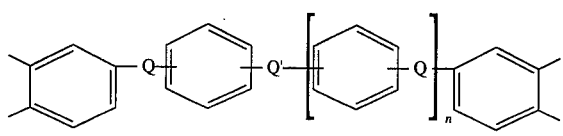

In these structures, Q and Q', independently of one another, may be identical or different. They may be a chemical bond or a radical selected from the group consisting of —O—, —CO—, —S—, —SO$_2$—, —C(CH$_3$)$_2$—, —C(CF$_3$)$_2$— and —Si(CH$_3$)$_2$—. Q and Q' are preferably a chemical bond, —O—, —SO$_2$— or —C(CH$_3$)$_2$—. n may be zero or 1. A very particularly preferred dianhydride a$_1$ is 4,4'-oxydiphthalic anhydride:

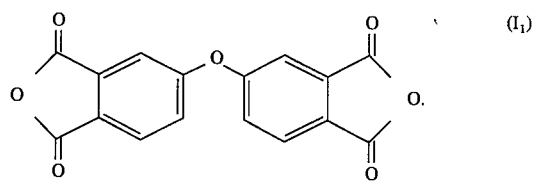

(I$_1$)

Mixtures of different dianhydrides a$_1$ may also be used. Examples of suitable mixtures are: 4,4'-oxydiphthalic dianhydride with biphenyltetracarboxylic dianhydride or 4,4'-oxydiphthalic dianhydride with benzophenonetetracarboxylic dianhydride or ternary mixtures of 4,4'-oxydiphthalic dianhydride, biphenyltetracarboxylic dianhydride and benzophenonetetracarboxylic dianhydride.

According to the invention, pyromellitic dianhydride

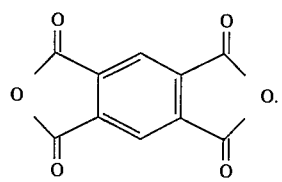

is used as dianhydride a$_2$.

According to the invention, the diamine component B consists of from from 50 to 100 mol % of at least one diamine b$_1$ and from 0 to 50 mol % of at least one diamine b$_2$. Mixtures of from 50 to 99 mol % of b$_1$ and from 1 to 50 mol % of b$_2$ are preferably used. Diamine components consisting of from 65 to 99, in particular from 65 to 97, mol % of b$_1$ and accordingly from 1 to 35, in particular from 3 to 35, mol % of b$_2$ are particularly preferred. Diamine components B consisting of from 70 to 95 mol % of b$_1$ and from 5 to 30 mol % of b$_2$ are very particularly preferred.

The diamines b$_1$ are of the formula II

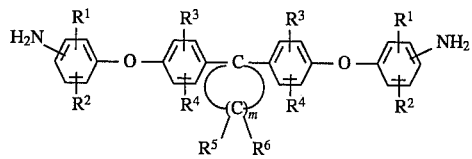

In this formula, R$^1$ to R$^4$, independently of one another, may be identical or different and may be hydrogen or halogen, preferably chlorine. R$^1$ to R$^4$ may furthermore each be C$_1$–C$_{12}$-alkyl. This may be either linear or branched. Examples are methyl, ethyl, n-propyl, isopropyl, n-butyl, isobutyl, tert-butyl, n-decyl and n-dodecyl. Other suitable radicals R$^1$ to R$^4$ are C$_1$–C$_{12}$-alkoxy, which may be either linear or branched. Methoxy, ethoxy, n-propoxy, isopropoxy, n-butoxy, isobutoxy, tert-butoxy, n-decyloxy and n-dodecyloxy are among the suitable alkoxy groups. R$^1$ to R$^4$ may furthermore be C$_5$–C$_7$-cycloalkyl, especially cyclopentyl or cyclohexyl. C$_6$–C$_{18}$-Aryl radicals are also suitable radicals R$^1$ to R$^4$, among which phenyl, biphenyl and naphthyl are preferred. It is also possible for R$^1$ to R$^4$ to be C$_4$- or C$_5$-hetaryl, in particular pyridyl or thionyl.

R$^1$ to R$^4$ may further each be C$_1$–C$_{12}$-alkyl-C$_6$–C$_{18}$-aryl, especially benzyl or alkyl-substituted, preferably methyl-, ethyl- or propyl-substituted, phenyl.

R$^1$ to R$^4$ are very particularly preferably identical and are each hydrogen.

The substituents of the cycloaliphatic ring, R$^5$ and R$^6$, independently of one another, may be identical or different and may be hydrogen or halogen, preferably chlorine. R$^5$ and R$^6$ may furthermore each be C$_1$–C$_{12}$-alkyl. This may be either linear or branched. Examples are methyl, ethyl, n-propyl, isopropyl, n-butyl, isobutyl, tert-butyl, n-decyl and n-dodecyl. Other suitable radicals R$^5$ and R$^6$ are C$_1$–C$_{12}$-alkoxy, which may be either linear or branched. Methoxy, ethoxy, n-propoxy, isopropoxy, n-butoxy, isobutoxy, tert-butoxy, n-decyloxy and n-dodecyloxy are among the suitable alkoxy groups. R$^5$ and R$^6$ may furthermore be C$_5$–C$_7$-cycloalkyl, especially cyclopentyl or cyclohexyl. C$_6$–C$_{18}$-Aryl radicals are also suitable radicals R$^5$ and R$^6$, among which phenyl, biphenyl and naphthyl are preferred. It is also possible for R$^5$ and R$^6$ to be C$_4$- or C$_5$-hetaryl, in particular pyridyl or thionyl.

R$^5$ and R$^6$ may furthermore each be C$_1$–C$_{12}$-alkyl-C$_6$–C$_{18}$-aryl, especially benzyl or alkyl-substituted, preferably methyl-, ethyl- or propyl-substituted, phenyl.

R$^5$ and R$^6$ are very particularly preferably hydrogen or C$_1$–C$_3$-alkyl, especially methyl. In particular, at least one carbon atom in the cycloaliphatic ring has two identical alkyl groups as radicals R$^5$ and R$^6$.

According to the invention, m is an integer from 4 to 7, preferably 4 or 5.

Examples of suitable diamines b$_1$ are shown below:

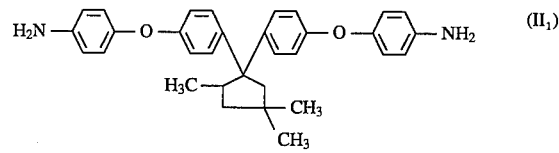

(II$_1$)

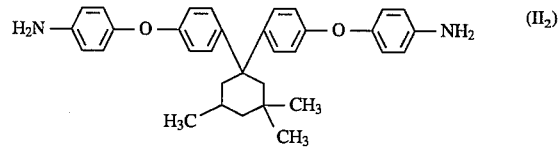

(II$_2$)

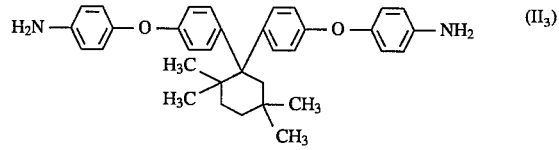

(II$_3$)

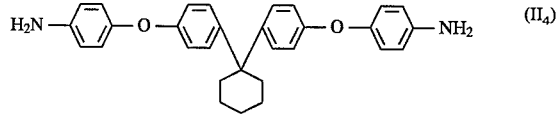

(II$_4$)

A very particularly preferred diamine b$_1$ is 1,1-bis[4-(4-aminophenoxy)phenyl]-3,3,5-trimethylcyclohexane (II$_2$).

Mixtures of different diamines b$_1$ may also be used. An example of a suitable mixture is diamine II$_2$ with diamine II$_4$.

The dianhydrides $b_1$ are known per se. Processes for their preparation are also known. At this point, reference may be made to the patent applications stated at the outset.

According to the invention, suitable diamines $b_2$ are those of the general formula III

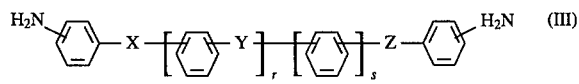

In this X, Y and Z, independently of one another, may be identical or different and may be a chemical bond or may be selected from the group consisting of —O—, —CO—, —S—, —SO$_2$—, —C(CH$_3$)$_2$—, —C(CF$_3$)$_2$— and —Si(CH$_3$)$_2$—. X, Y and Z are each preferably a chemical bond, —O— or —SO$_2$—.

The preferred diamines $b_2$ include

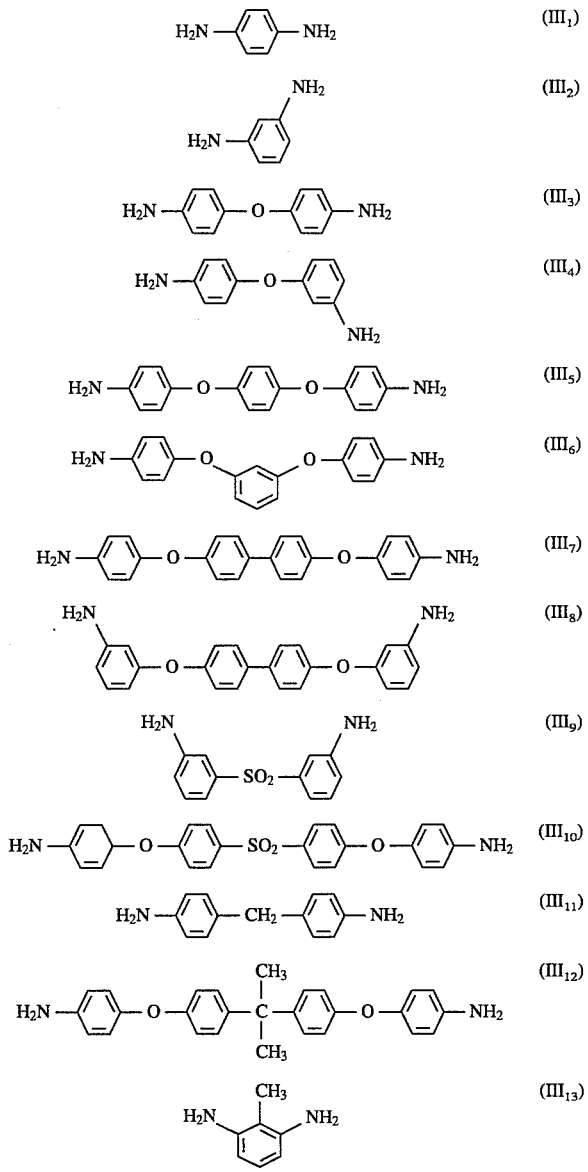

Among these, 4,4'-bis(p-aminophenoxy)diphenyl sulfone (III$_{10}$) is particularly preferred.

Such diamines are known per se or can be prepared by known methods.

The novel polyimides have, as a rule, reduced viscosities of from 20 to 200, preferably from 30 to 130, ml/g. The reduced viscosities are measured in N-methylpyrrolidone at a concentration of 0.5 g/100 ml. The novel polyimides are obtained in general as crystalline substances. As a rule, however, they cannot be recrystallized. The melting points and glass transition temperatures of the novel polyimides are determined by DSC. For this purpose, the polyimides are heated at a rate of 20° C./min. In general, the melting points are from 250° to 500° C., in particular from 280° to 450° C. The glass transition temperatures are in general from 200° to 400° C., in particular from 220° to 380° C.

In order to obtain good mechanical properties, it is advantageous if the number average molecular weight $\bar{M}_n$ of the novel polyimides is at least 8000 g/mol. For many intended uses, $\bar{M}_n$ may be from 15,000 to 20,000 g/mol; molecular weights $\bar{M}_n$ of more than 30,000 g/mol are generally not required.

According to the invention, polyimides are prepared by reacting the dianhydride component (A) with the diamine component (B). A is in each case a mixture of the dianhydrides $a_1$ and $a_2$ if B consists only of the diamines $b_1$, and B is in each case a mixture of $b_1$ and $b_2$ if A consists only of the dianhydride component $a_1$. Of course, the novel polyimides also include those which are obtainable from A and B, A being a mixture of $a_1$ and $a_2$ and B a mixture of $b_1$ and $b_2$. In the course of this reaction, presumably the anhydride rings are first converted into the corresponding amide/carboxylic acid functions. This polyamidocarboxylic acid prepolymer then undergoes cyclization with elimination of water to give the corresponding polyimide, as shown schematically below:

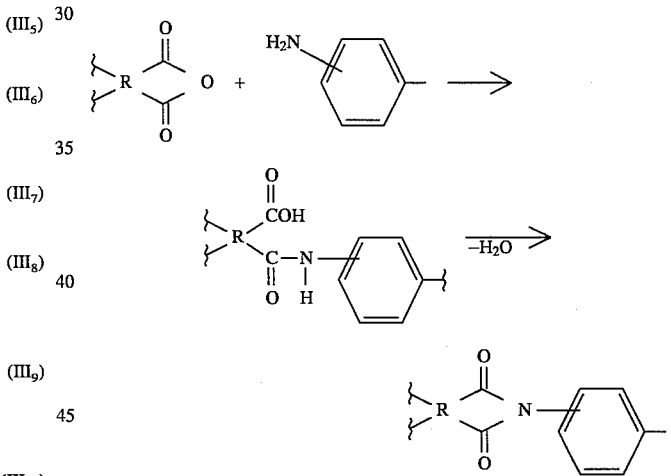

Monofunctional compounds may be added at the beginning of the reaction or during it, but also after the molecular weight has increased. This makes it possible to control the molecular weights of the polyimides and the flow properties as well as the stability of their melts. Suitable monofunctional compounds are aromatic anhydrides, such as phthalic anhydride, and aromatic amines, e.g. aniline.

Elimination of water is carried out in a solvent or in a solvent mixture. Preferably used solvents are dipolar aprotic solvents, such as N,N-dimethylformamide, N,N-dimethylacetamide, N-methylpyrrolidone, dimethyl sulfoxide, diphenyl sulfone, sulfolane, γ-butyrolactone and N-methylcaprolactam. N-Methylpyrrolidone is particularly preferred. It is often advantageous concomitantly to use one or more cosolvents which, together with water, form an azeotropic mixture which permits the removal of the resulting water of reaction by azeotropic distillation. The suitable cosolvents include, for example, toluene, mesitylene and dichlorobenzene.

Depending on the reactivity of the diamine component, the elimination of water is effected at elevated temperature, preferably in the presence of a cosolvent, or at a lower temperature in the presence of a catalyst. A measure of the reactivity of the diamine component is its basicity constant, expressed as pKa (cf. for example Bessonov et al.: Polyimides—Thermally Stable Polymers, Consultants Bureau, New York 1987, 20 et seq.). In general, the catalytic process is preferred for diamines having a pKa greater than 4.5, otherwise the purely thermal process.

Elimination of water in the absence of a catalyst generally begins at 20° C. and takes place at a marked rate in general only from 80° C. upward. Temperatures of more than 190° C. are generally not required when a cosolvent is present. In the presence of a catalyst, the polyamidocarboxylic acid prepolymer undergoes cyclization at a high rate as a rule at below 100° C., in general even at less than 70° C.

In general, mixtures of tertiary amines and anhydrides of lower fatty acids are used as catalysts. Suitable tertiary amines are aliphatic amines, such as tributylamine, triethylamine or triisopropylamine, or aromatic amines, such as pyridine, dimethylaminopyridine, lutidine, quinoline or isoquinoline. Examples of suitable anhydrides are acetic anhydride, hexanoic anhydride, caprylic anhydride and lauric anhydride. Acetic anhydride is preferably used.

The novel polyimides have good solubility in the stated solvents. In general, they are completely soluble in these solvents even in concentrations above 10% by weight. As a rule, they have reduced viscosities of 20 or more, preferably 30 or more, ml/g, measured in N-methylpyrrolidone at a concentration of 0.5 g/100 ml. The novel polyimides generally do not have reduced viscosities above 200 ml/g, measured in N-methylpyrrolidone at a concentration of 0.5 g/100 ml. Preferred polyimides are those having reduced viscosities of 130 ml/g or less, measured in N-methylpyrrolidone at a concentration of 0.5 g/100 ml.

Conventional additives in amounts of up to 50, preferably from 5 to 30, % by weight, based on the mixture, may be added to the novel polyimides. The additives include fibrous or particulate fillers or reinforcing agents, such as carbon fibers or glass fibers, glass beads and calcium silicates, such as wollastonite and kaolin.

Further additives which may be added to the novel polyimides are, for example, stabilizers, flow impovers and dyes. These may be present in the novel polyimides in general in amounts of from 0.01 to 10% by weight.

The novel polyimides are amorphous and may be processed thermoplastically by methods known per se to give moldings, fibers or sheet-like structures. They have high heat-distortion resistance and very good melt stability. The polyimides are preferably to be processed from the melt. However, it is also possible to disperse the polyimides in a dispersing medium prior to processing. Processing may be effected, for example, by compression molding, extrusion, injection molding or thermoforming. However, it is also possible to apply a melt or emulsion to reinforcing fibers or reinforcing mats and to mold the resulting semifinished product, if desired after removal of the dispersing medium.

EXAMPLES

Components:

$a_{1.1}$: 4,4'-oxydiphthalic anhydride ($I_1$)

$b_{1.1}$: 1,1-bis[4-(aminophenoxy)phenyl]-3,3,5-trimethyl-cyclohexane ($II_2$)

$b_{2.1}$: 4,4'-bis(4-aminophenoxy)diphenylsulfone ($III_{10}$)

$b_{2.2}$: 2,2'-bis(4-aminophenoxyphenyl)propane ($III_{12}$)

Example 1

Polyimide obtained from $a_{1.1}$ and a mixture of 90 mol % of $b_{1.1}$ and 10 mol % of $b_{2.1}$.

4.30 g (23 mmol) of $b_{1.1}$ and 1.08 g (2.5 mmol) of $b_{2.1}$ were dissolved in 100 ml of N-methylpyrrolidone under nitrogen. 0.15 g (1.0 mmol) of phthalic anhydride and 7.76 g (25.0 mmol) of $a_{1.1}$ were then added, the reaction mixture being cooled. After the reaction mixture had been stirred for 24 hours at room temperature, it was diluted by adding N-methylpyrrolidone, and 0.03 g (0.25 mmol) of 4-dimethylaminopyridine and 12 ml of acetic anhydride were introduced. The reaction mixture was then heated to 60° C. and stirred at this temperature for 5 hours. The polyimide was obtained by precipitation in methanol. The product purified with methanol and dried had a reduced viscosity of 99 ml/g (measured in 0.5% strength by weight solution in N-methylpyrrolidone at 25° C.) and a glass transition temperature Tg of 259° C. (measured at a heating rate of 20 K/min). The melt stability of the resulting polyimide was determined at 400° C. and at a shear rate of $10^2$ $s^{-1}$. The melt viscosity was 2400 Pa.s when determined immediately and 2000 Pa.s after 15 minutes.

Example 2

The experiment was carried out as described under Example 1, except that $b_{1.1}$ and $b_{2.1}$ were used in a molar ratio of 70/30.

The reduced viscosity of the resulting polyimide was 86 ml/g (measured in 0.5% strength by weight solution in N-methylpyrrolidone at 25° C.) and the glass transition temperature Tg was 258° C. (measured at a heating rate of 20 K/min). The melt stability was determined as described under 1. The melt viscosities were 1800 Pa.s when determined immediately and 1200 Pa.s (after 15 minutes).

Example 3

The experiment was carried out as described under Example 1, except that $b_{1.1}$ and $b_{2.2}$ were used in a molar ratio of 90/10.

The reduced viscosity of the resulting polyimide was 96 ml/g (measured in 0.5% strength by weight solution in N-methylpyrrolidone at 25° C.) and the glass transition temperature Tg was 266° C. (measured at a heating rate of 20 K/min). The melt stability was determined as described under 1. The melt viscosities were 2200 Pa.s when determined immediately and 2000 Pa.s (after 15 minutes).

We claim:

1. A polyimide obtained by reacting

A) a dianhydride component consisting of $a_1$) from 50 to 100 mol % of at least one dianhydride of the formula I where R is a tetravalent aromatic or heteroaromatic radical, with the exception of

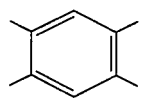

and $a_2$) from 0 to 50 mol % of a pyromellitic dianhydride with

B) a diamine component consisting of
  b₁) from 50 to 100 mol % of at least one diamine of the formula II

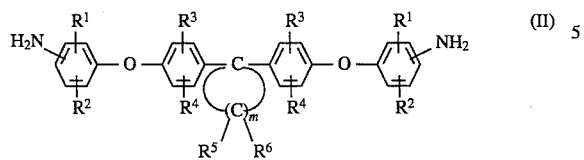

where R¹ to R⁴ independently of one another, are identical or different and are hydrogen, halogen, $C_1$–$C_{12}$-alkyl, $C_1$–$C_{12}$-alkoxy, $C_5$–$C_7$-cycloalkyl, $C_6$–$C_{18}$-aryl, $C_4$- or $C_5$-hetaryl or $C_1$–$C_{12}$-alkyl-$C_6$–$C_{18}$-aryl,
  R⁵ and R⁶, independently of one another, are identical or different and can be individually selected for each C atom in the alicyclic ring and are hydrogen, $C_1$–$C_{12}$-alkyl, $C_1$–$C_{12}$-alkoxy, $C_5$-$C_7$-cycloalkyl, $C_6$-$C_{18}$-aryl, $C_4$- or $C_5$-hetaryl or $C_1$-$C_{12}$-alkyl-$C_6$-$C_{18}$-aryl, and
  m is an integer from 4 to 7, and
  b₂) from 0 to 50 mol % of at least one diamine of the formula III

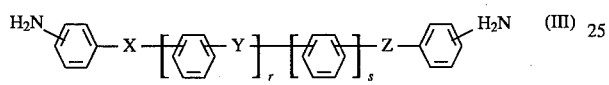

where X, Y and Z, independently of one another, are identical or different and are a chemical bond or are selected from the group consisting of —O—, —CO—, —S—, —SO₂—, —C(CH₃)₂—, —C(CF₃)₂— and —Si(CH₃)₂— and
  r and s, independently of one another, are identical or different and are 0 or 1,
with the proviso that the component A is a mixture of a₁ and a₂ if the component B consists only of b₁ and component B is a mixture of b₁ and b₂ if the component A consists only of a₁.

2. A polyimide as defined in claim 1, obtained by reacting
  A) a dianhydride component consisting of
    a₁) from 65 to 95 mol % of at least one dianhydride of the formula I and
    a₂) from 5 to 35 mol % of pyromellitic dianhydride and a diamine component B.

3. A polyimide as claimed in claim 1, obtainable by reacting a dianhydride component A with
  B) a diamine component consisting of
    b₁) from 65 to 95 mol % of at least one diamine of the formula II and
    b₂) from 5 to 35 mol % of at least one diamine of the formula III.

4. A polyimide as defined in claim 1, in which the dianhydrides are of the formula I, where R is a product selected from the group consisting of

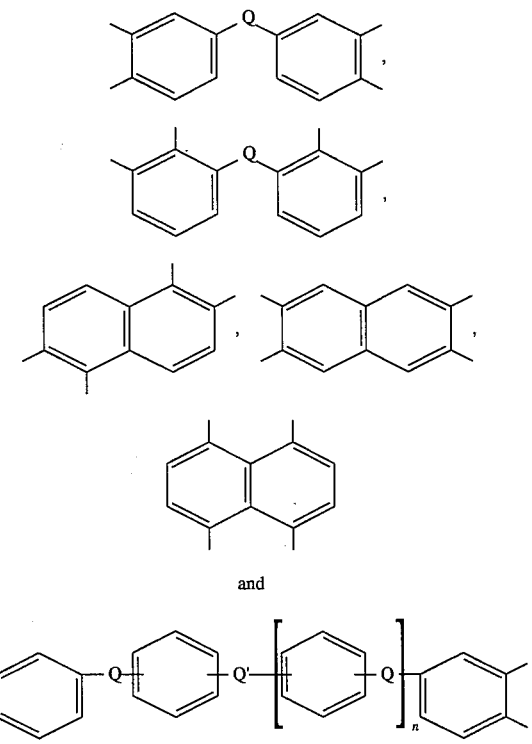

where Q and Q', independently of one another, are identical or different and are a direct bond or a radical selected from the group consisting of —O—, —CO—, —S—, —SO₂—, —C(CH₃)₂—, —C(CF₃)₂— and —Si(CH₃)₂— and
n is 0 or 1.

5. A polyimide as defined in claim 1, in which the diamine b₁ is 1,1,-bis[4-(4-aminophenoxy)phenyl]-3,3,5-trimethylcyclohexane.

6. A polyimide as defined in claim 1, in which the diamine b₂ is 4,4'-bis(p-aminophenoxy)diphenyl sulfone.

7. A molding, fiber or film, obtained from a polyimide as defined in claim 1.

* * * * *

UNITED STATES PATENT AND TRADEMARK OFFICE
CERTIFICATE OF CORRECTION

PATENT NO.: 5,496,915

DATED: March 5, 1996

INVENTOR(S): FISCHER et al.

It is certified that error appears in the above-identified patent and that said Letters Patent is hereby corrected as shown below:

Column 8, claim 1, line 57, after "formula I" insert the following structure:

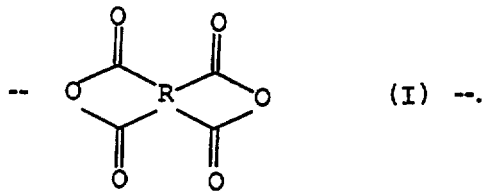

Signed and Sealed this

Fourth Day of June, 1996

Attest:

Attesting Officer

BRUCE LEHMAN

Commissioner of Patents and Trademarks